April 9, 1940. W. E. MERRIMAN 2,196,737
SOUND REPRODUCTION APPARATUS
Filed May 9, 1939 2 Sheets-Sheet 1
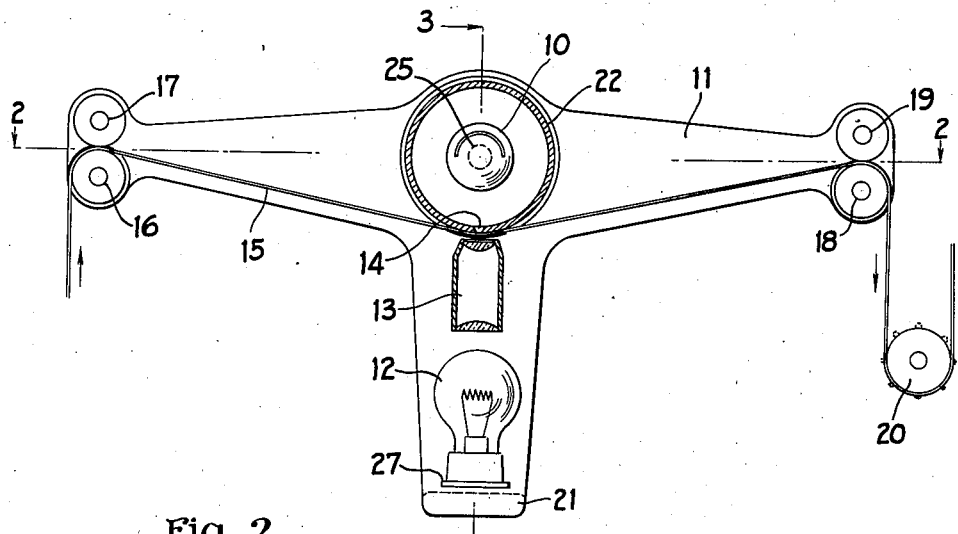
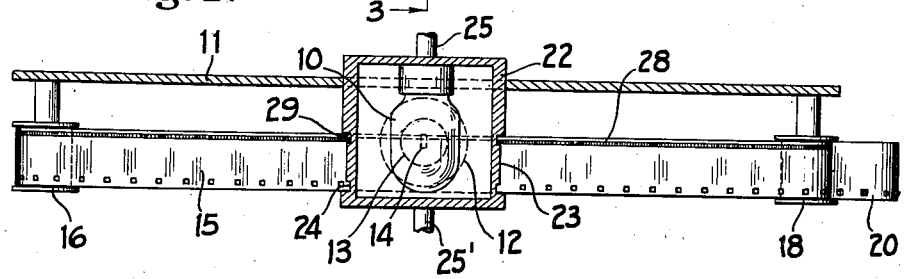
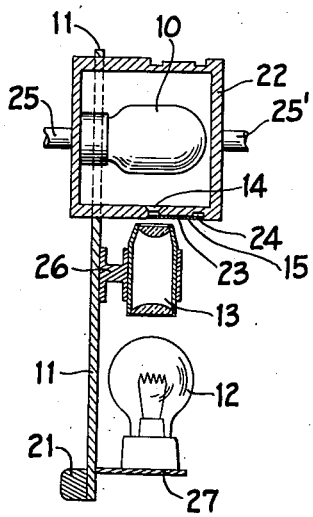
Inventor
William E. Merriman Inventor
William E. Merriman Patented Apr. 9, 1940

2,196,737

UNITED STATES PATENT OFFICE 2,196,737

SOUND REPRODUCTION APPARATUS

William E. Merriman, Rochester, N. Y., assignor to Eastman Kodak Company, Rochester, N. Y., a corporation of New Jersey Application May 9, 1939, Serial No. 272,727

5 Claims. (Cl. 179—100.3)

This invention relates to apparatus for the reproduction of sound and particularly to devices for scanning a sound track carried by motion picture film.

In the reproduction of sound from sound-on-film, considerable difficulty is experienced in advancing the film band past the sound head at a constant rate of speed. Obviously, any changes in the speed with which the film is moving causes a distortion in the sound in the form of a change in frequency of vibrations per second. It is an object of the present invention to eliminate or compensate for the changes in film speed.

It is a particular object of the invention to provide means responsive to any momentary or sudden change in film speed, to take up that change so that the speed of the film at the sound gate is substantially constant or changes only slowly.

According to the invention, the film band moving past the sound gate is supported on opposite sides of the sound gate by two rollers, either idling or brake rollers, which rollers are mounted on the opposite ends of the top of a T-shaped member, the upright part of the T acting as a pendulum. This pendulum is pivoted near the sound gate and the film supporting rollers are mounted at two points spaced at equal and fixed distances from the aperture and in approximately the same horizontal plane as the aperture.

In one embodiment of the invention the pendulum is pivoted exactly at the aperture, i. e. to swing about a line through the aperture. In another embodiment, the light source and optical system for focusing a line of light on the sound track is carried by the pendulum and the pendulum is pivoted to rotate about the photoelectric cell by means of which the sound is reproduced.

Other objects and advantages of the invention will be apparent from the accompanying drawings in which:

Fig. 1 shows a front elevation of one embodiment of my invention.

Fig. 2 is a horizontal cross section of the arrangement shown in Fig. 1.

Fig. 3 is a vertical cross section of the arrangement shown in Fig. 1.

Figure 4:
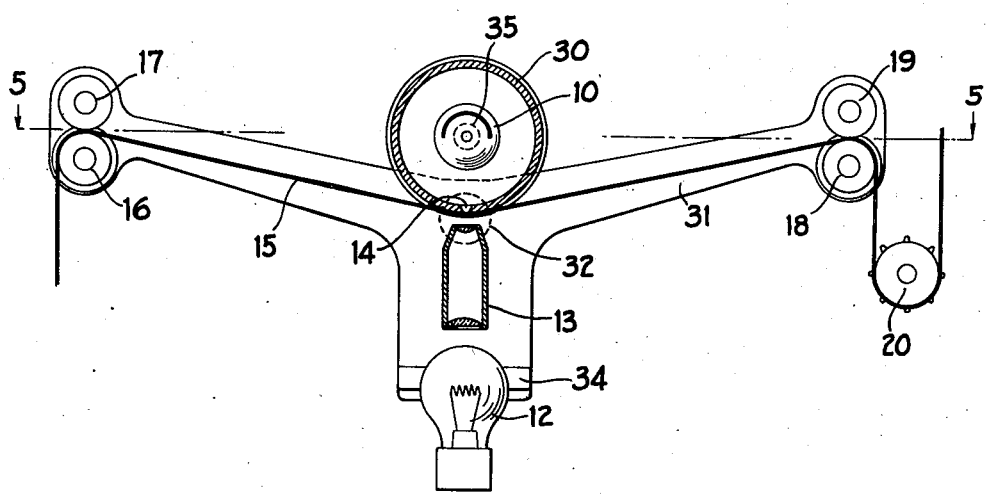
Fig. 4 is a front elevation of another embodiment of my invention.

In Figs. 1, 2, and 3 there is shown a device for scanning sound on film. A photoelectric cell 10 is mounted to be exposed from below by a light source 12 and an optical system 13 which focuses a line of light on a plane which for convenience I define as the "sound gate". A suitably grooved drum 22 surrounding the cell 10 guides a moving film band 15 so that the sound track 28 thereon moves past the sound gate 14. In this specification and the accompanying claims, the term "sound gate" refers to the point at which the sound track is scanned, whether or not there is a physical diaphragm right at the gate defining its dimensions.

According to the invention two rollers 16 and 18 are provided at equal distances from and on opposite sides of the film gate 14. These rollers 16 and 18 are carried on the ends of the horizontal part of a T-shaped member 11 which acts as a pendulum pivoted near the sound gate 14. In the specific embodiment shown in Figs. 1, 2 and 3 the pendulum 11 is actually pivoted at the point 25 to swing about the photoelectric cell 10.

In this embodiment the light source 12 and the optical system 13 are rigidly connected by mounts 27 and 26 respectively to the pendulum 11 to swing therewith. The pendulum 11 is also provided with a counter weight 21 which determines the natural period of oscillation of the pendulum. Any conventional driving means shown in the form of a sprocket 20 may be provided for advancing the film through this device. The roller 18 is an idling roller and the roller 16 is either an idling roller or a brake roller provided with a suitable degree of friction. Idling rollers 17 and 19 are also provided to ride on the film passing over rollers 16 and 18 respectively and to eliminate any chatter of the film at these points.

As best shown in Figs. 2 and 3, the drum 12 is provided with recessed portions 23, 24, and 29, which act as guides for the film 15. In the specific arrangement shown, the film slides over the portion 23, the sound track 28 not being in contact with the surface and the sound gate 14 is in the form of an aperture in the recess 29. The whole unit oscillates on the shaft shown at 25 and 25'.

In some cases it is not desirable to have the film rub on the surface 23 and, therefore, the recess 29 may be cut all the way through the drum 22 so that the drum 22 is in two parts. One part of this drum 22 then oscillates on the shaft 25 and the other part including the surface 23 is free to rotate about the shaft 25' and is driven by the film 15 itself. This latter arrangement is the preferable one, but for the purposes of the present invention it does not matter which arrangement is used.

Figure 5:
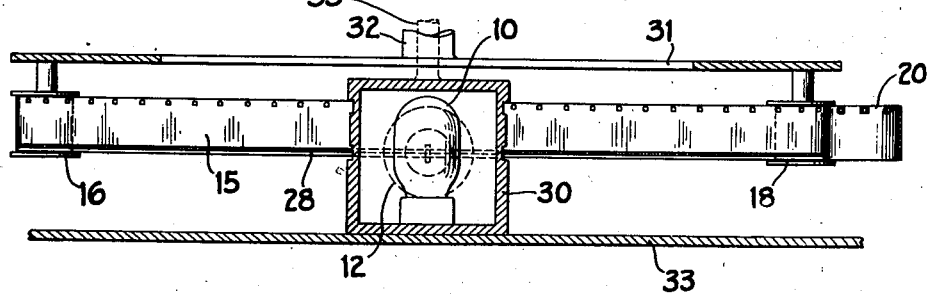
Fig. 5 is a horizontal cross section of the arrangement shown in Fig. 4.

In the specific embodiment shown in Figs. 4 and 5 the photoelectric cell 10 is rigidly mounted in a housing 30 on a support 33. The lamp 12 and the optical system 13 are also rigidly connected to the support 33 in any suitably manner (not shown). In this particular embodiment the supporting rollers 16 and 18 are carried by a T-shaped pendulum 31 which is pivoted by a shaft 32 to rotate about the sound gate 14. In this case the counter-weight 34 for the pendulum 31 extends from both sides of the pendulum, whereas in Fig. 3 the counter-weight 21 merely extended from one side since the lamp 12 and optical system 13 were mounted on the other side.

In both embodiments i. e. that shown in Fig. 1 and that shown in Fig. 4 the roller 16 supports the film at points equidistant from the sound gate 14. In Fig. 1 this constancy of the distances to the supporting rollers is due to the fact that the rollers 16 and 18 and the sound gate all rotate about the same pivot 25. In Fig. 4 the sound gate 14 is the point of pivot itself.

The alternative arrangement discussed in connection with Figs. 1 and 2, wherein the guide drum 22 is slit into two parts so that one part may rotate freely under the driving force of the film, may be incorporated into the arrangement shown in Figs. 4 and 5 by similarly splitting the drum 30 and allowing one portion of it to rotate freely on a shaft 35 shown in broken lines. From Fig. 4 it is obvious that this shaft 35 is above the shaft 32 and for the small oscillation amplitude to which the pendulum is subjected, this shaft 35 does not interfere with the pendulum action.

The operation of the invention in either embodiment is as follows: The film 15 is driven at a substantially but not quite constant rate by the driving sprocket 20. According to the invention any sudden change in this speed is compensated for by a motion of the pendulum so that there will be no disagreeable distortion of the sound. Under a constant driving speed, the pendulum 11 or 31 remains in a substantially vertical position with the rollers 16 and 18 at approximately the same horizontal level; in fact the roller 18 will in general take up a stable position somewhat below the level of the brake roller 16. If there is a sudden increase in speed of the film band 15, the acceleration will cause the idling roller 18 to move downward and the brake roller 16 to move upward so that the film moving past the sound gate 14 does not respond immediately to the change in speed. If the film speed now becomes constant at this higher speed, the pendulum will shift back slowly to a stable position so that there will be no annoying distortion in the sound. On the other hand, if there is a sudden slowing down of the film, the roller 18 will move up and the roller 16 will move down so that the film will at least momentarily continue to move at its normal rate past the sound gate 14. Thus it is the sudden changes or surges in film speed that are smoothed out by the invention.

The actual horizontal level of the rollers 16 and 18 is not critical, but obviously they should be on about the same level as the sound gate 14 in order to give the maximum effect, i. e. the maximum control of the film speed. It does not matter whether the film moves over the photocell 10 and the illuminating system is from above or whether the arrangement is used as shown with the illuminating system below the photocell 10. However, the arrangement shown is more convenient, particularly in the case of Fig. 1 wherein the illuminating system is mounted on the pendulum itself. Additional guiding means may be provided for controlling the motion of the film past the sound gate 14, but such guides are not necessary to the present invention.

Having thus described two embodiments of my invention, I wish to point out that it is not limited to the specific structures shown but is of the scope of the appended claims.

What I claim and desire to secure by Letters Patent of the United States is:

1. A device for scanning a sound track carried by a film band, comprising a photoelectric cell, apertured means for guiding the film band past the cell, a sound gate near the cell, the aperture in the guiding means being adjacent said sound gate, means for illuminating the cell through said sound track and sound gate, a pendulum pivoted near said sound gate to swing in a plane parallel to the direction of movement of the film band and means carried by the pendulum for supporting the film band at two points spaced at equal and fixed distances on opposite sides of the sound gate and in approximately the same horizontal plane as the sound gate.

2. A device according to claim 1 in which the pendulum is pivoted to swing about the sound gate.

3. A device according to claim 1 in which the illuminating means, the guiding means and the photoelectric cell are all mounted on and carried by the pendulum.

4. A device according to claim 1 in which the illuminating means is mounted on and carried by the pendulum and in which the pendulum is pivoted to swing about the photoelectric cell.

5. A device for scanning a sound track carried by a film band, comprising means for advancing the film, a photoelectric cell mounted to be exposed from below, a housing for the cell including a cylindrical portion mounted to rotate freely about one end of the cell, a sound gate below the cell, means for illuminating the sound track at said sound gate, means including said cylindrical portion for guiding the film band under the cell and the sound track through said sound gate, the sound gate being visible to the cell at all times, a pendulum pivoted to swing about the cell and carrying said illuminating means and two rollers carried by the pendulum for supporting the film at equal and fixed distances on opposite sides of the cell.

WILLIAM E. MERRIMAN.